US011115290B2

(12) United States Patent
Ramlall et al.

(10) Patent No.: US 11,115,290 B2
(45) Date of Patent: Sep. 7, 2021

(54) NETWORK MONITORING OF TIME SYNCHRONIZATION PROTOCOLS USING CONVOLUTIONAL NEURAL NETWORKS

(71) Applicant: The United States of America as Represented by the Secretary of the Navy, San Diego, CA (US)

(72) Inventors: Rohan Yash Ramlall, San Diego, CA (US); Matthew Ralph Capella, San Diego, CA (US)

(73) Assignee: United States of America as Represented by the Secretary of the Navy., Washington, DC (US)

( * ) Notice: Subject to any disclaimer, the term of this patent is extended or adjusted under 35 U.S.C. 154(b) by 112 days.

(21) Appl. No.: 16/737,577

(22) Filed: Jan. 8, 2020

(65) Prior Publication Data
US 2021/0211360 A1  Jul. 8, 2021

(51) Int. Cl.
*H04L 7/00* (2006.01)
*H04L 12/24* (2006.01)
*G06N 3/08* (2006.01)
*H04L 12/757* (2013.01)
*H04L 29/12* (2006.01)

(52) U.S. Cl.
CPC .............. *H04L 41/16* (2013.01); *G06N 3/08* (2013.01); *H04L 41/0622* (2013.01); *H04L 45/023* (2013.01); *H04L 61/2503* (2013.01)

(58) Field of Classification Search
CPC . H04L 41/16; H04L 61/2503; H04L 41/0622; H04L 45/023; G06N 3/08
See application file for complete search history.

(56) References Cited

U.S. PATENT DOCUMENTS 10,673,883 B2 * 6/2020 Wetterwald ......... H04L 43/0852
2017/0078170 A1 * 3/2017 Vasseur .................. G06N 20/00
2020/0036538 A1    1/2020 Ramlall

OTHER PUBLICATIONS

Mills et al., Network Time Protocol Version 4: Protocol and Algorithms Specification, Request for Comments 5905, 110 pages, Jun. 2010.*

(Continued)

*Primary Examiner* — Frank Duong
(74) *Attorney, Agent, or Firm* — Naval Information Warfare Center, Pacific; Kyle Eppele; James McGee

(57) ABSTRACT

A device and method monitor integrity of a communication network. A local clock maintains a local time. A network interface receives time synchronization packets and associates with each the local time of receipt at the network interface. A processing system implements a neural network for classifying whether integrity of the communication network is compromised from originate, receive, and transmit values determined from the time synchronization packets. The originate value is a difference between the local time of the receipt of the request packet and a transmission timestamp of the request packet. The receive value is a difference between a reception timestamp of the request packet or the reply packet and the local time of the receipt of the request packet or the reply packet. The transmit value is a difference between the local time of the receipt of the reply packet and a transmission timestamp of the reply packet.

20 Claims, 3 Drawing Sheets

(56) References Cited

OTHER PUBLICATIONS

Robledo, Network Time Protocol attacks detection, Thesis, Czech Technical University in Prague, 73 pages, Dec. 9, 2015.*
E. Lisova, et al., "Protecting Clock Synchronization: Adversary Detection through Network Monitoring," Journal of Electrical and Computer Engineering, 2016.
M. Haber, "The Implications of Network Time Protocol (NTP) for Cybersecurity," Mar. 2019.
D. Rielly, et al., "Network Time Protocol Best Current Practices draft-ietf-ntp-bcp-06," Internet Engineering Task Force, Dec. 2017.
W. Yang, et al., "Security Vulnerabilities and Countermeasures for Time Synchronization in IEEE802.15.4e Networks," 2016 IEEE 3rd International Conference on Cyber Security and Cloud Computing, IEEE Computer Society, 2016.
T. Kawamura, et al., "A Network-based Event Detection Module Using NTP for Cyber Attacks on IoT," 2018 Sixth International Symposium on Computing and Networking Workshops, pp. 86-91, 2018.
A. Malhotra, et al., "Attacking the Network Time Protocol," NDSS '16, Internet Society, Feb. 2016.

* cited by examiner

NETWORK MONITORING OF TIME SYNCHRONIZATION PROTOCOLS USING CONVOLUTIONAL NEURAL NETWORKS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 109618.

BACKGROUND OF THE INVENTION

Timing is a critical part of today's networks. Protocols for network time synchronization, like Network Time Protocol (NTP) and Precise Time Protocol (PTP), are used in both commercial and military networks to distribute accurate timing across the network. Unfortunately, these protocols are vulnerable to cyber-attacks.

SUMMARY

A device for monitoring integrity of a communication network includes a local clock, a network interface, and a processing system. The local clock maintains a local time. The network interface receives from the communication network data packets that include time synchronization packets. The network interface associates each time synchronization packet with the local time of receipt at the network interface. The processing system implements a neural network for classifying whether or not the integrity of the communication network is compromised in response to originate, receive, and transmit values determined from the time synchronization packets. The time synchronization packets include request packets and reply packets, and bidirectional message exchanges each include a respective one of the request packets and one of the reply packets replying to the respective one of the request packets. The originate value for each bidirectional message exchange is a difference between the local time of the receipt of the request packet in the bidirectional message exchange and a transmission timestamp of the request packet as measured by a sending device. The receive value for each bidirectional message exchange is a difference between a reception timestamp of the request packet or the reply packet in the bidirectional message exchange as measured by a receiving device and the local time of the receipt of the request packet or the reply packet. The transmit value for each bidirectional message exchange is a difference between the local time of the receipt of the reply packet in the bidirectional message exchange and a transmission timestamp of the reply packet as measured by another sending device.

A method for monitoring integrity of at least one time synchronization protocol comprises the following steps. Time synchronization packets of the time synchronization protocol are received from a communication network, which transfers data packets including the time synchronization packets. A local time of receipt from the communication network is associated with each time synchronization packet. The time synchronization packets include request packets and reply packets, each one of the reply packets replying to a respective one of the request packets. A transmission timestamp of transmission is determined for each of the request packets, and an originate value is calculated that is a difference between the local time of the receipt of the request packet and the transmission timestamp of transmission of the request packet. A reception timestamp is determined for each of the request packets or the reply packets, and a receive value is calculated that is a difference between the reception timestamp and the local time of the receipt of the request packet or the reply packet. A transmission timestamp of transmission is determined for each of the reply packets, and a transmit value is calculated that is a difference between the local time of the receipt of the reply packet and the transmission timestamp of transmission of the reply packet. A neural network is implemented for generating a classification value that classifies whether or not the integrity of the time synchronization protocol is compromised in response to the originate, receive, and transmit values for the request packets and the reply packets. A user is notified that the integrity of the time synchronization protocol is under the attack in response to the classification value exceeding a threshold.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
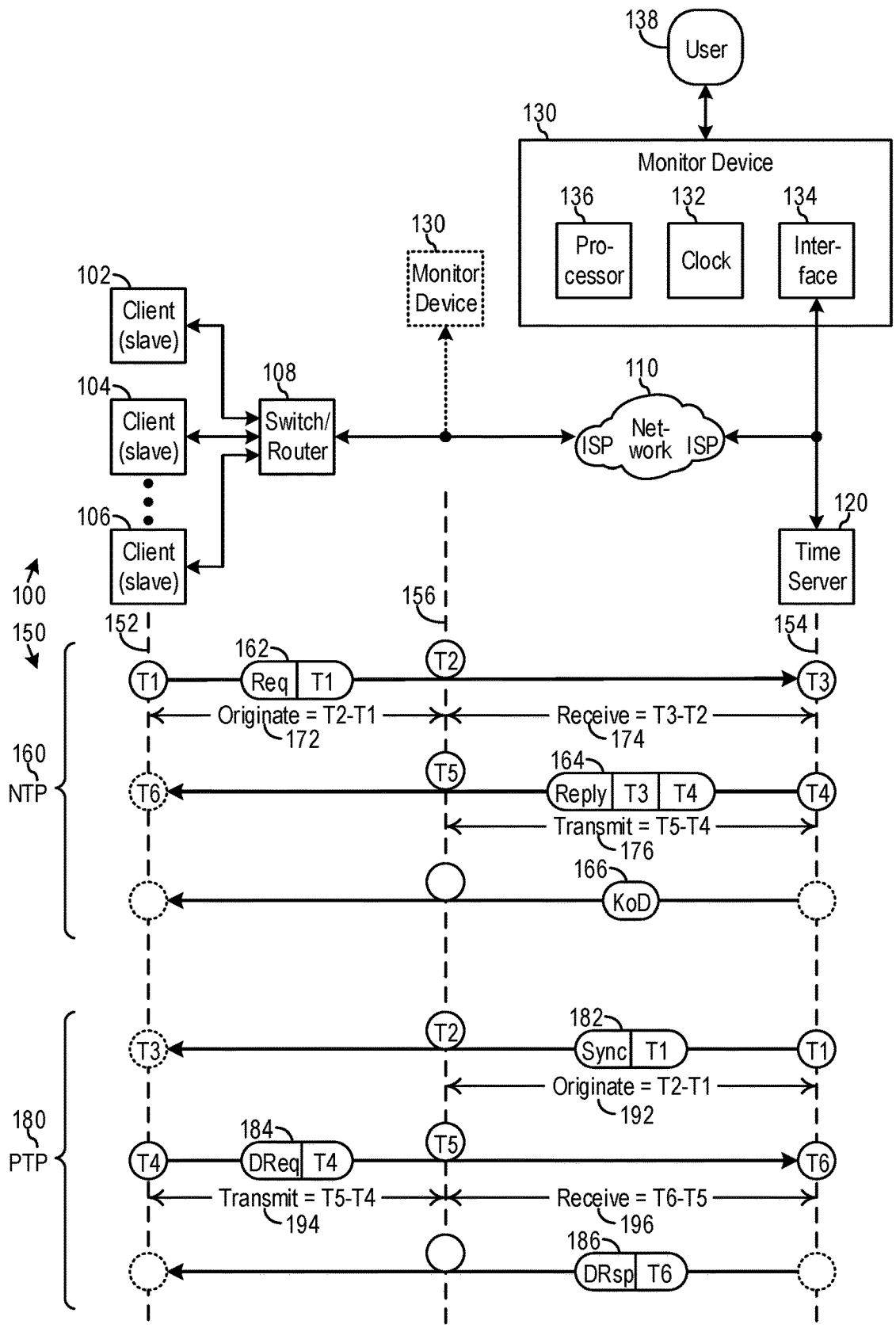
FIG. 1 is a block diagram of a system for monitoring the integrity of the communication network, together with a protocol diagram of time synchronization packets transferred over the communication network, both in accordance with an embodiment of the invention.

FIG. 1 is a block diagram of a system 100 for monitoring the integrity of the communication network 110, together with a protocol diagram 150 of time synchronization packets transferred over the communication network 110, both in accordance with embodiments of the invention.

The system 100 includes a time server 120 and the clients 102 and 104 through 106 that synchronize timekeeping with the time server 120. The communication network 110 transfers data packets among the time server 120 and the clients 102 and 104 through 106. These data packets include time synchronization packets used to synchronize timekeeping between time server 120 and the clients 102 and 104 through 106. The clients 102 and 104 through 106 synchronize timekeeping with a time server 120 by exchanging time synchronization packets over communication network 110. Switch or router 108 connects clients 102 and 104 through 106 to the communication network 110 via an internet service provider (ISP). Time server 120 is also connected to the communication network 110 either directly or via an ISP.

A device 130 monitors the integrity of the communication network 110 by eavesdropping on the time synchronization packets transferred between the time server 120 and the clients 102 and 104 through 106. In one embodiment, the monitor device 130 is implemented within the time server 120. In another embodiment, the monitor device 130 is implemented within the switch or router 108. In another embodiment, the monitor device 130 is a separate device attached at a connection between an ISP and a specific one of either the time server 120 or the clients 102 and 104 through 106. An ISP connects the communication network 110 to the time server 120 and/or the clients 102 and 104 through 106. In one example, the monitor device 130 is attached to communication network 110 at the point where time server 120 is attached to communication network 110. Alternatively, as shown for monitor device 130 in dotted outline, the monitor device 130 is attached along a path connecting communication network 110 and clients 102 and 104 through 106. Monitor device 130 is attached between a client 102 and switch or router 108 in another example (not shown). It will be appreciated that multiple instances of monitor device 130 are attached at various locations within communication network 110 in certain embodiments.

The monitor device 130 includes a local clock 132 for maintaining a local time. The monitor device 130 includes a network interface 134 for receiving from the communication network 110 data packets that include the time synchronization packets. The network interface 134 associates each time synchronization packet received from the communication network 110 with the local time of receipt at the network interface 134. The monitor device 130 also includes a processing system 136 that implements a neural network for classifying whether or not the integrity of the communication network 110 is compromised.

Referring to protocol diagram 150 of FIG. 1, the time synchronization packets include time synchronization packets of a Network Time Protocol (NTP) 160, a Precise Time Protocol (PTP) 180, or both. Generally, the time synchronization packets include request packets and reply packets of the time synchronization protocol or protocols. The time synchronization packets include bidirectional message exchanges, which each include a respective one of the request packets and one of the reply packets replying to the respective request packet. The protocol diagram 150 includes a line 152 of packet transmission and reception events at client 106, a line 154 of packet transmission and reception events at time server 120, and a line 156 of packet eavesdropping events at monitor device 130. For clarity, line 156 is shown in the middle of the protocol diagram 150 to correspond to the location of the monitor device 130 shown in dotted outline.

For the Network Time Protocol (NTP) 160, any or all of clients 102 and 104 through 106 initiate synchronizing the time kept at the client with the time server 120 by sending the request packet that is a Request packet 162 of NTP 160 transferred from the client to the time server 120. For example, client 106 initiates time synchronization with the Request packet 162 containing the transmission timestamp of the time T1 of transmission of the Request packet 162 from client 106. Due to delays, such as wire propagation delays and queuing delays inside switch or router 108, at later time T2 this Request packet 162 is received at the network interface 134 of the monitor device 130. Typically later still, at time T3 the Request packet 162 is received at time server 120.

From the received Request packet 162, the processing system 136 of the monitor device 130 extracts T1 and determines the originate value 172 that for NTP 160 is the difference T2-T1 between the local time T2 of the receipt of the Request packet 162 at the monitor device 130 and the extracted transmission timestamp of the time T1 of transmission of the Request packet 162 as measured by sending client 106. Although in absolute terms time T2 should be later than T1, with sufficient skew in time measurement between client 106 and the monitor device 130, the value of T2-T1 might actually be negative.

At time T4, the time server 120 replies to the received Request packet 162 with a Reply packet 164 of NTP 160 transferred from the time server 120 to the client 106. The time server 120 includes within the Reply packet 164 both the reception timestamp of the time T3 of reception of the respective Request packet 162 at the time server 120 and the transmission timestamp of the time T4 of transmission of the Reply packet 164 from the time server 120. Together, the Request packet 162 and the Reply packet 164 form a bidirectional message exchange of NTP 160.

At time T5, this Reply packet 164 is received at the network interface 134 of the monitor device 130. From the received Reply packet 164, the processing system 136 of the monitor device 130 extracts T3 and T4. The processing system 136 determines the receive value 174 for the bidirectional message exchange that for NTP 160 is a difference T3-T2 between a reception timestamp of the time T3 of receiving the Request packet 162 at the time server 120 as measured by the time server 120 and the local time T2 of the receipt of the Request packet 162 at the monitor device 130. The processing system 136 also determines the transmit value 176 for the bidirectional message exchange that for NTP 160 is a difference T5-T4 between the local time T5 of the receipt of the Reply packet 164 at the monitor device 130 and a transmission timestamp of the time T4 of transmission of the Reply packet 164 as measured by the sending time server 120.

Later still, the Reply packet 164 is received at client 106. However, the processing system 136 is unaware of this time T6 of reception of the Reply packet 164 at the client 106 because time T6 is not included in any time synchronization packets, so monitor device 130 cannot eavesdrop to determine time T6 for NTP 160; this is indicated in protocol diagram 150 with the dotted outline around time T6 for NTP 160.

The time synchronization packets of NTP 160 further include at least one "Kiss of Death" packet 166. Each "Kiss of Death" packet 166 is transferred from a particular time server 120 to a particular one of clients 102 and 104 through 106, such as client 106. The particular time server 120 is adapted to transfer the "Kiss of Death" packet 166 to the particular client 106 in response to the particular client 106 transferring to the particular time server 120 an excessive number of Request packets within a predetermined time interval. The particular client 106 is adapted to stop transferring any more Request packets to the particular time server 120 in response to receiving the "Kiss of Death" packet 166 from the particular time server 120. However, the particular client 106 might continue time synchronization with a different time server.

The Precise Time Protocol (PTP) 180 overcomes certain deficiencies of NTP 160, including that for NTP 160 the time server 120 cannot prevent becoming overwhelmed from too many clients 102 and 104 through 106 initiating Request packets, especially if these clients ignore or do not receive the "Kiss of Death" packet 166. Thus, in PTP 180, the time server 120 is the master that initiates time synchronization to achieve direct control over the rate of time synchronization, and the clients 102 and 104 through 106 are denoted slaves for PTP 180.

For PTP 180, the time server 120 initiates synchronizing the time kept at clients 102 and 104 through 106, for example, client 106, with the time server 120 sending the request packet that is a Sync packet 182 of PTP 180 transferred from the time server 120 to the client 106. The time server 120 includes within the Sync packet 182 the transmission timestamp of the time T1 of transmission of the Sync packet 182 from the time server 120. Due to various propagation delays typically, at later time T2 this Sync packet 182 is received at the network interface 134 of the monitor device 130. Later still, at time T3 the Sync packet 182 is received at client 106. Note that for PTP 180, the processing system 136 is unaware of this time T3 of reception of the Sync packet 182 at the client 106 because time T3 is not included in any time synchronization packets, so monitor device 130 cannot eavesdrop to determine time T3 for PTP 180. In PTP 180, the time server 120 might also send a separate Follow Up packet that is part of the request packet and contains an accurate timestamp of the time T1 of transmission of the Sync packet 182.

From the received Sync packet 182, the processing system 136 of the monitor device 130 extracts T1 and determines the originate value 192 that for PTP 180 is the difference T2-T1 between the local time T2 of the receipt of the Sync packet 182 at the monitor device 130 and the extracted transmission timestamp of the time T1 of transmission of the Sync packet 182 as measured by sending time server 120.

At time T4, the client 106 replies to the received Sync packet 182 with the reply packet that for PTP 180 is a Delay Request packet 184 transferred from the client 106 to the time server 120. The client 106 includes within the Delay Request packet 184 the transmission timestamp of the time T4 of transmission of the Delay Request packet 184 from the client 106.

At time T5, this Delay Request packet 184 is received at the network interface 134 of the monitor device 130. From the received Delay Request packet 184, the processing system 136 of the monitor device 130 extracts T4. The processing system 136 determines the transmit value 194 for the bidirectional message exchange that for PTP 180 is a difference T5-T4 between the local time T5 of the receipt of the Delay Request packet 184 at the monitor device 130 and a transmission timestamp of the time T4 of transmission of the Delay Request packet 184 as measured by the sending client 106.

Later still at time T6, the Delay Request packet 184 is received at the time server 120. In response, the time server 120 transmits a Delay Response packet 186 to client 106. The time server 120 includes within the Delay Response packet 186 the reception timestamp of the time T6 of reception of the respective Delay Request packet 184 at the time server 120.

When the monitor device 130 later receives the Delay Response packet 186, the processing system 136 extracts T6 and determines the receive value 196 for the bidirectional message exchange that for PTP 180 is a difference T6-T5 between the reception timestamp of the time T6 of reception of the Delay Request packet 184 as measured by the time server 120 and the local time T5 of the receipt of the Delay Request packet 184 at the monitor device 130.

The time synchronization packets of PTP 180 include the request packets like Sync packet 182, the reply packets like Delay Request packet 184, and time synchronization packets of PTP 180 further include Delay Response packets like Delay Response packet 186 transferred from time server 120 to the clients 102 and 104 through 106. For PTP 180, each of the bidirectional message exchanges includes one of the Delay Response packets acknowledging a respective one of the Delay Request packets. Together, the Sync packet 182, Delay Request packet 184, and the Delay Response packet 186 form a bidirectional message exchange of PTP 180.

For both NTP 160 and PTP 180, the originate values 172 and 192 are determined from the timing of the request packet, which is Request packet 162 for NTP 160 and Sync packet 182 for PTP 180. For both NTP 160 and PTP 180, the transmit values 176 and 194 are determined from the timing of the reply packet, which is Reply packet 164 for NTP 160 and Delay Request packet 184 for PTP 180. However, the receive value 174 for NTP 160 is determined from the timing of the request packet that is Request packet 162, but the receive value 196 for PTP 180 is instead determined from the timing of the reply packet that is Delay Request packet 184.

The processing system 136 of the monitor device 130 implements a neural network for classifying whether or not the integrity of the communication network is compromised in response to the originate values 172 and 192, the receive values 174 and 196, and the transmit values 176 and 194. The processing system 136 notifies a user 138 of the monitor device 130 when the integrity of the communication network is compromised.

Figure 2:
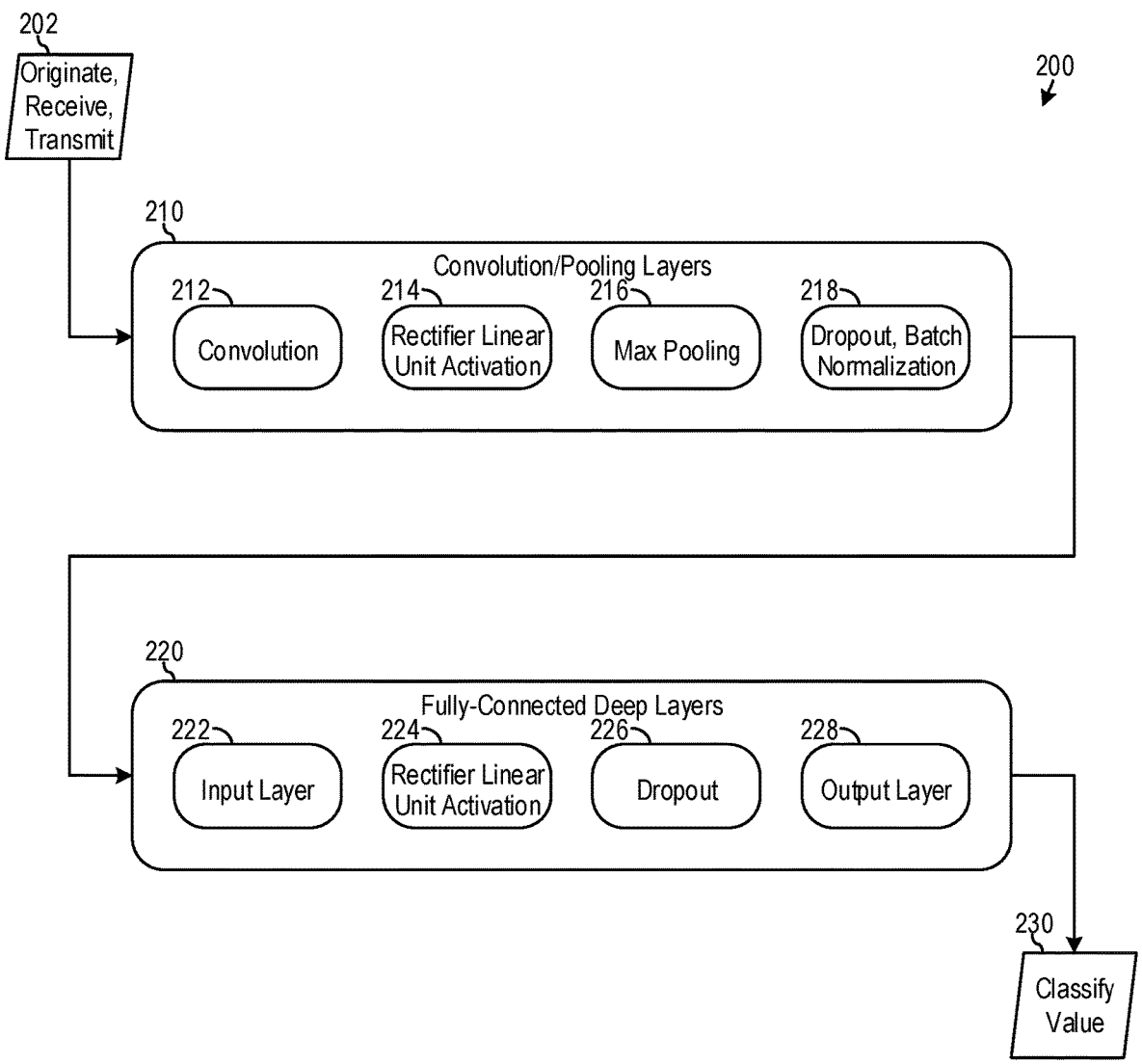
FIG. 2 is a block diagram of a neural network for classifying whether the integrity of the communication network is compromised in accordance with an embodiment of the invention.

FIG. 2 is a block diagram of a neural network 200 for classifying whether the integrity of the communication network is compromised from the originate, receive, and transmit values 202 in accordance with an embodiment of the invention. The neural network 200 is a convolutional neural network including convolution/pooling layers 210 and deep learning layers 220.

The convolution/pooling layers 210 input the originate, receive, and transmit values 202 determined from the time synchronization packets. The convolution/pooling layers 210 output a max pooling-derived down-sampling of a convolution operation calculated from the originate, receive, and transmit values 202. The convolution/pooling layers 210 reduce data dimensionality while retaining the key features that differentiate between nominal and compromised integrity of the communication network. The convolution/pooling layers 210 include a convolution operation 212, a rectifier and linear unit activation 214, max-pooling 216, and dropout and batch normalization 218.

The convolution operation 212 performs a convolution operation between current and previous originate, receive, and transmit values 202. In one embodiment as discussed below in the description of FIG. 3, the originate, receive, and transmit values 202 are aggregated into matrices, for example 3×30 matrices each including 30 3×1 vectors, referred to as "slabs," with each slab containing the 3 values that are the originate, receive, and transmit values of a bidirectional message exchange of the time synchronization packets. The convolution operation 212 performs a convolution across the entirety of the inputted matrix using, for example, a small 2×2 filter with a stride of 1 providing high fidelity.

The rectifier and linear unit activation 214 introduces non-linearity by, for example, setting negative values to zero. The max-pooling 216 down-samples while controlling overfitting using, for example, a 3×3 kernel or a 2×2 kernel, to produce originate, receive, and transmit matrices with reduced dimension, such as 2×15. The dropout and batch normalization 218 randomly ignores some input values to combat overfitting in which the subsequent deep learning layers 220 merely memorize various inputs verbatim.

The deep learning layers 220 input the max-pooling-derived down-sampling from the convolution/pooling layers 210, for example, inputting the reduced dimension 2×15 matrices after their flattening to 1×30 vectors. The deep learning layers 220 output a classification value 230 specifying a predicted probability that the integrity of the communication network is compromised. The deep learning layers 220 include an input layer 222, a rectifier and linear unit activation layer 224, a dropout layer 226, and an output layer 228. The deep learning layers 220 include fully connected neurons in this embodiment.

In one embodiment, a user is notified that the integrity of the communication network is compromised when the classification value 230 exceeds a threshold. This notification includes, for example, an identification of an internet protocol (IP) address on the communication network for each device that is originating the attack on the time synchronization protocol. In addition, the user is notified the integrity of the time synchronization protocol is under the attack when there are an excessive number of the request packets and/or the reply packets within a predetermined time interval, or when there is an excessive time interval without any of the request packets and/or the reply packets from a problematic device on the communication network, including identifying an internet protocol (IP) address of the problematic device.

Figure 3:
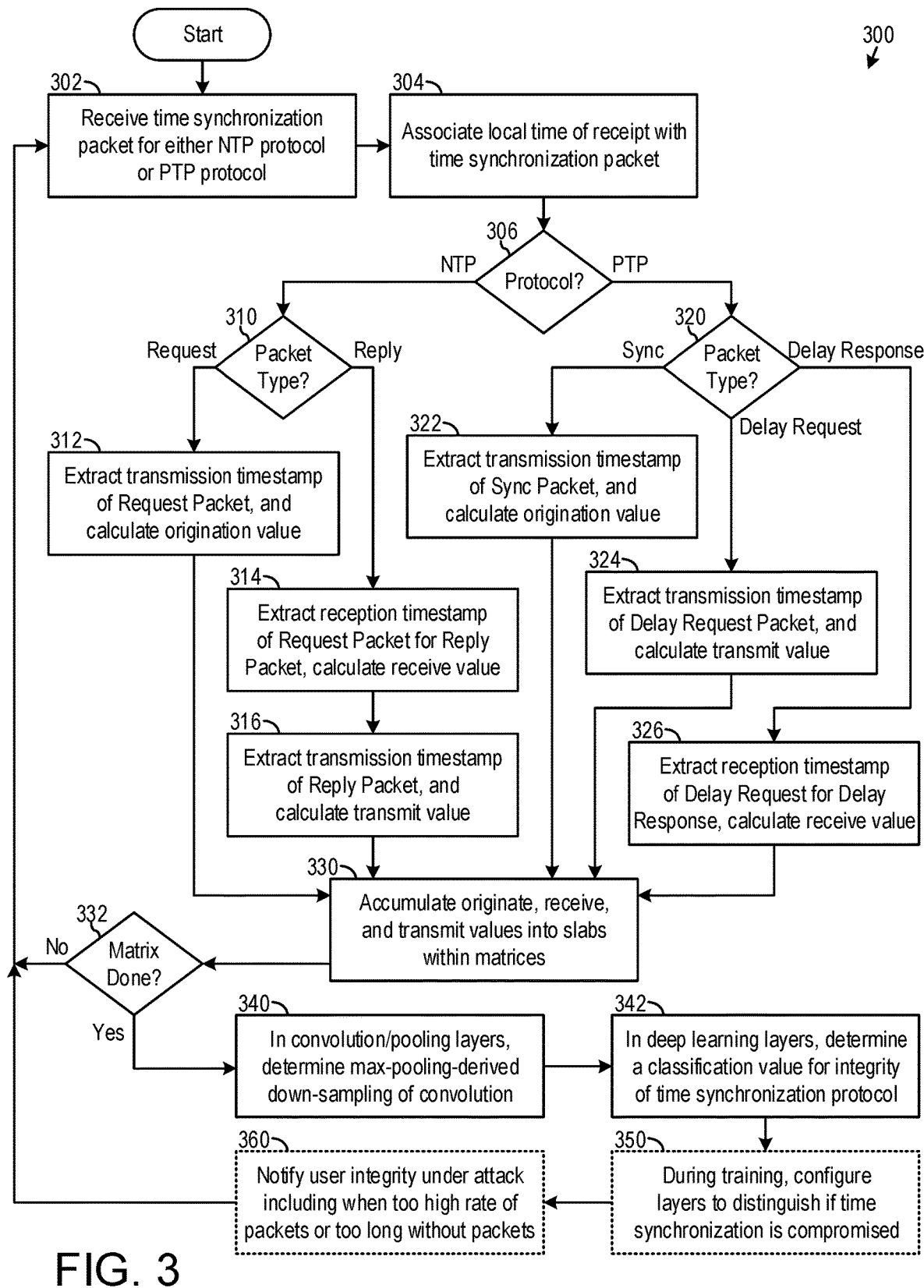
FIG. 3 is a flow diagram of a process for monitoring integrity of at least one time synchronization protocol in accordance with an embodiment of the invention.

FIG. 3 is a flow diagram of a process 300 for monitoring integrity of at least one time synchronization protocol in accordance with an embodiment of the invention. This flow diagram is used during both training and subsequent normal operation during which a neural network notifies a user that the integrity of the communication network is compromised.

At step 302, a monitor device eavesdrops on a time synchronization packet for either the NTP protocol or the PTP protocol. At step 304, the monitor device associates a local time of receipt from the communication network with the time synchronization packet. The time synchronization packets include request packets and reply packets, each one of the reply packets replying to a respective one of the request packets.

Decision 306 checks whether the protocol for the time synchronization packet is the NTP protocol or the PTP protocol. For the NTP protocol, process 300 proceeds to decision 310. For the PTP protocol, process 300 proceeds to decision 320.

Decision 310 checks the type of the NTP time synchronization packet. For a Request packet, process 300 proceeds to step 312. For a Reply packet, process 300 proceeds to step 314. Step 312 extracts a transmission timestamp from the Request packet, and calculates an originate value that is a difference between the local time of the receipt of the Request packet and the transmission timestamp of transmission of the Request packet. Step 314 extracts from the Reply packet a reception timestamp of reception of the respective Request packet for the Reply packet. Step 314 also calculates a receive value that is a difference between the reception timestamp and the local time of the receipt of the respective Request packet. Step 316 extracts a transmission timestamp from the Reply packet, and calculates a transmit value that is a difference between the local time of the receipt of the Reply packet and the transmission timestamp of transmission of the Reply packet.

Decision 320 checks the type of the PTP time synchronization packet. For a Sync packet, process 300 proceeds to step 322. For a Delay Request packet, process 300 proceeds to step 324. For a Delay Response packet, process 300 proceeds to step 326. Step 322 extracts a transmission timestamp from the Sync packet, and calculates an originate value that is a difference between the local time of the receipt of the Sync packet and the transmission timestamp of transmission of the Sync packet. Step 324 extracts a transmission timestamp from the Delay Request packet, and calculates a transmit value that is a difference between the local time of the receipt of the Delay Request packet and the transmission timestamp of transmission of the Delay Request packet. Step 326 extracts from the Delay Response packet a reception timestamp of reception of the respective Delay Request packet for the Delay Response packet. Step 326 also calculates a receive value that is a difference between the reception timestamp and the local time of the receipt of the respective Delay Request packet.

Step 330 accumulates originate, receive, and transmit values into time-series matrices to be evaluated. For example, step 330 accumulates 3×30 matrices each including 30 3×1 vectors ("slabs") with each slab containing the 3 values that are the originate, receive, and transmit values of a bidirectional message exchange from the time synchronization packets. Decision 332 checks whether the current matrix is fully accumulated. If so, process 300 proceeds to step 340; otherwise, process 300 returns to step 302.

Step 340, in convolution/pooling layers of a convolutional neural network, computes a max-pooling derived down-sampling of a convolution operation over the matrices of originate, receive, and transmit values. Step 342, in deep learning layers of the convolutional neural network, determines a classification value that classifies whether or not the integrity of the time synchronization protocol is compromised.

During training of the convolutional neural network, the time synchronization packets provided to process 300 are simulated or collected time synchronization packets divided into two classes, which are a baseline and under cyber attack. At step 350 during training, this labeled data adjusts weight and bias values within the deep learning layers to learn and distinguish between these two classes. Thus, training configures the convolutional neural network to output the classification value specifying a predicted probability that the integrity of the time synchronization protocol is compromised.

During nominal operation after completing training, step 360 notifies a user that the integrity of the time synchronization protocol is under the attack in response to the classification value exceeding a threshold. Step 360 also notifies the user that the integrity of the time synchronization protocol is under the attack when there is an excessive number of the request packets and/or the reply packets within a predetermined time interval, or when there is an excessive time interval without any of the request packets and/or the reply packets from a problematic device on the communication network.

From the above description of the Network Monitoring of Time Synchronization Protocols Using Convolutional Neural Networks, it is manifest that various techniques may be used for implementing the concepts of system 100 and process 300 without departing from the scope of the claims. The described embodiments are to be considered in all respects as illustrative and not restrictive. The method/ apparatus disclosed herein may be practiced in the absence of any element that is not specifically claimed and/or disclosed herein. It should also be understood that system 100 and process 300 are not limited to the particular embodiments described herein, but is capable of many embodiments without departing from the scope of the claims.

We claim:

1. A device for monitoring an integrity of a communication network comprising:
   a local clock for maintaining a local time;
   a network interface for receiving from the communication network a plurality of data packets including a plurality of time synchronization packets, the network interface adapted to associate each of the time synchronization packets received from the communication network with the local time of receipt at the network interface; and
   a processing system adapted to implement a neural network for classifying whether or not the integrity of the communication network is compromised in response to originate, receive, and transmit values determined from the time synchronization packets, which include a plurality of request packets and a plurality of reply packets, with a plurality of bidirectional message exchanges each including a respective one of the request packets and one of the reply packets replying to the respective one of the request packets,
   wherein the originate value for each of the bidirectional message exchanges is a difference between the local time of the receipt of the request packet in the bidirectional message exchange and a transmission timestamp of the request packet as measured by a sending device,
   wherein the receive value for each of the bidirectional message exchanges is a difference between a reception timestamp of the request packet or the reply packet in the bidirectional message exchange as measured by a receiving device and the local time of the receipt of the request packet or the reply packet,
   wherein the transmit value for each of the bidirectional message exchanges is a difference between the local time of the receipt of the reply packet in the bidirectional message exchange and a transmission timestamp of the reply packet as measured by another sending device.

2. The device of claim 1, wherein:
   the neural network is a convolutional neural network including a plurality of convolution/pooling layers and a plurality of deep learning layers;
   the convolution/pooling layers input the originate, receive, and transmit values determined from the time synchronization packets and output a max-pooling-derived down-sampling of a convolution operation calculated from the originate, receive, and transmit values;
   the deep learning layers input the max-pooling-derived down-sampling and output a classification value specifying a predicted probability that the integrity of the communication network is compromised; and
   the processing system is further adapted to notify a user of the device that the integrity of the communication network is compromised in response to the classification value exceeding a threshold.

3. The device of claim 1, wherein:
   the processing system is adapted to implement the neural network for classifying whether or not the integrity of a time synchronization protocol is under attack in response to the originate, receive, and transmit values determined from the time synchronization packets of the time synchronization protocol; and
   the processing system is further adapted to notify a user of the device that the integrity of the time synchronization protocol is under the attack, including identifying an internet protocol (IP) address on the communication network for each of at least one device that is originating the attack on the time synchronization protocol.

4. The device of claim 3, wherein:
   the processing system is further adapted to notify the user that the integrity of the time synchronization protocol is under the attack in response to an excessive number of the request packets and/or the reply packets within a predetermined time interval; and
   the processing system is further adapted to notify the user that the integrity of the time synchronization protocol is under the attack in response to an excessive time interval without any of the request packets and/or the reply packets from a problematic device on the communication network, including identifying an internet protocol (IP) address of the problematic device.

5. The device of claim 1, wherein:
   the time synchronization packets are for the Network Time Protocol (NTP), wherein the request packets are a plurality of Request packets of NTP and the reply packets are a plurality of Reply packets of NTP;
   each of the Request packets is transferred from at least one client to at least one time server, and the client includes within the Request packet the transmission timestamp of transmission of the Request packet from the client; and
   each of the Reply packets is transferred from the at least one time server to the at least one client, and the time server includes within the Reply packet both the reception timestamp of reception of the respective Request packet at the time server and the transmission timestamp of transmission of the Reply packet from the time server,
   wherein, via the network interface, the processing system extracts from each of the Request packets the transmission timestamp of transmission of the Request packet, and extracts from each of the Reply packets both the reception timestamp of reception of the respective Request packet for the Reply packet and the transmission timestamp of transmission of the Reply packet.

6. The device of claim 5, wherein:
   the plurality of time synchronization packets of NTP further include at least one "Kiss of Death" packet, each transferred from a particular one of the at least one time server to a particular one of the at least one client;
   the particular time server is adapted to transfer the "Kiss of Death" packet to the particular client in response to the particular client transferring to the particular time server an excessive number of the Request packets within a predetermined time interval; and
   the particular client is adapted to stop transferring any of the Request packets to the particular time server in response to receiving the "Kiss of Death" packet from the particular time server.

7. The device of claim 5, wherein the processing system is unaware of a time of a reception of each of the Reply packets at the client.

8. The device of claim 1, wherein:
   the time synchronization packets are for the Precise Time Protocol (PTP), wherein the request packets are a plurality of Sync packets of PTP and the reply packets are a plurality of Delay Request packets of PTP;

each of the Sync packets is transferred from at least one time server to at least one client, and the time server includes within the Sync packet the transmission timestamp of transmission of the Sync packet from the time server;

each of the Delay Request packets is transferred from the at least one client to the at least one time server, and the client includes within the Delay Request packet the transmission timestamp of transmission of the Delay Request packet from the client; and the plurality of time synchronization packets of PTP further include a plurality of Delay Response packets transferred from the at least one time server to the at least one client, each of the bidirectional message exchanges including one of the Delay Response packets acknowledging a respective one of the Delay Request packets, and the time server includes within the Delay Response packet the reception timestamp of reception of the respective Delay Request packet at the time server, wherein, via the network interface, the processing system extracts from each of the Sync packets the transmission timestamp of transmission of the Sync packet, extracts from each of the Delay Request packets the transmission timestamp of transmission of the Delay Request packet, and extracts from each of the Delay Response packets the reception timestamp of reception of the respective Delay Request packet at the time server.

9. The device of claim 8, wherein the processing system is unaware of a time of a reception of each of the Sync packets at the client.

10. A system for monitoring the integrity of the communication network, the system including the device of claim 1 and comprising:

a time server;

a plurality of clients that synchronize timekeeping with the time server using the time synchronization packets of the data packets; and the communication network for transferring the data packets among the time server and the clients, wherein the system includes the device of claim 1 adapted to eavesdrop on the time synchronization packets transferred between the time server and the clients.

11. The system of claim 10, wherein the device is one of:
implemented within the time server,
implemented within a switch or a router connecting the clients to the communication network, and
a separate device attached at a connection between an internet service provider (ISP) and a specific one of either the time server or the clients, the connection of the ISP for connecting the communication network to the specific one of either the time server or the clients.

12. The system of claim 10, wherein the time synchronization packets include both a plurality of time synchronization packets of the Network Time Protocol (NTP) and a plurality of time synchronization packets of the Precise Time Protocol (PTP).

13. A method for monitoring an integrity of at least one time synchronization protocol at a device for monitoring a communication network comprising:

receiving a plurality of time synchronization packets of the at least one time synchronization protocol from the communication network, which transfers a plurality of data packets including the time synchronization packets;

associating a local time of receipt from the communication network with each of the time synchronization packets, which time synchronization packets include a plurality of request packets and a plurality of reply packets, each one of the reply packets replying to a respective one of the request packets;

determining a transmission timestamp of transmission for each of the request packets, and calculating an originate value that is a difference between the local time of the receipt of the request packet and the transmission timestamp of transmission of the request packet;

determining a reception timestamp for each of the request packets or the reply packets, and calculating a receive value that is a difference between the reception timestamp and the local time of the receipt of the request packet or the reply packet;

determining a transmission timestamp of transmission for each of the reply packets, and calculating a transmit value that is a difference between the local time of the receipt of the reply packet and the transmission timestamp of transmission of the reply packet;

implementing a neural network for generating a classification value that classifies whether or not the integrity of the time synchronization protocol is compromised in response to the originate, receive, and transmit values for the request packets and the reply packets; and notifying a user that the integrity of the time synchronization protocol is under the attack in response to the classification value exceeding a threshold.

14. The method of claim 13, wherein:
the receiving of the time synchronization packets of the at least one time synchronization protocol includes receiving a plurality of time synchronization packets of the Network Time Protocol (NTP), wherein the request packets include a plurality of Request packets of NTP and the reply packets include a plurality of Reply packets of NTP, each of the Reply packets replying to a respective one of the Request packets;

the determining of the transmission timestamp for each of the request packets includes from each of the Request packets extracting the transmission timestamp of transmission of the Request packet;

the determining of the reception timestamp for each of the request packets or the reply packets includes from each of the Reply packets extracting the reception timestamp of reception of the respective Request packet for the Reply packet; and the determining of the transmission timestamp for each of the reply packets includes from each of the Reply packets additionally extracting the transmission timestamp of transmission of the Reply packet.

15. The method of claim 13, wherein:
the receiving of the time synchronization packets of the at least one time synchronization protocol includes receiving a plurality of time synchronization packets of the Precise Time Protocol (PTP), wherein the request packets include a plurality of Sync packets of PTP and the reply packets include a plurality of Delay Request packets of PTP, and the plurality of time synchronization packets of PTP further include a plurality of Delay Response packets, with each of the Delay Response packets acknowledging a respective one of the Delay Request packets;

the determining of the transmission timestamp for each of the request packets includes from each of the Sync packets extracting the transmission timestamp of transmission of the Sync packet;

the determining of the transmission timestamp for each of the reply packets includes from each of the Delay Request packets extracting the transmission timestamp of transmission of the Delay Request packet; and the determining of the reception timestamp for each of the request packets or the reply packets includes from each of the Delay Response packets extracting the reception timestamp of reception of the respective Delay Request packet for the Delay Response packet.

16. The method of claim 13, wherein the receiving of the time synchronization packets of the at least one time synchronization protocol includes receiving the time synchronization packets of both the Network Time Protocol (NTP) and the Precise Time Protocol (PTP).

17. The method of claim 13, further comprising:
transferring the time synchronization packets between a time server and a plurality of clients that synchronize timekeeping with the time server using the time synchronization packets,
wherein the receiving of the time synchronization packets includes eavesdropping on the time synchronization packets transferred between the time server and the clients.

18. The method of claim 13, wherein the implementing of the neural network includes:

implementing a plurality of convolution/pooling layers, which input the originate, receive, and transmit values and output a max-pooling-derived down-sampling of a convolution operation calculated from the originate, receive, and transmit values; and implementing a plurality of deep learning layers that input the max-pooling-derived down-sampling and output the classification value specifying a predicted probability that the integrity of the time synchronization protocol is compromised.

19. The method of claim 13, wherein the implementing of the neural network includes training the neural network to distinguish whether or not the integrity of the time synchronization protocol is compromised.

20. The method of claim 13, further comprising:
notifying the user that the integrity of the time synchronization protocol is under the attack in response to an excessive number of the request packets and/or the reply packets within a predetermined time interval; and
notifying the user that the integrity of the time synchronization protocol is under the attack in response to an excessive time interval without any of the request packets and/or the reply packets from a problematic device on the communication network.

* * * * *